United States Patent
Iida et al.

(10) Patent No.: US 7,456,871 B2
(45) Date of Patent: Nov. 25, 2008

(54) IMAGE MANAGEMENT SYSTEM MANAGING IMAGE DATA OBTAINED FROM AN IMAGING DEVICE CARRIED BY A VISITOR TO AN AREA IN A SAME MANNER AS IMAGE DATA OBTAINED FROM IMAGINING DEVICES FIXED TO PARTICULAR LOCATIONS IN THE AREA

(75) Inventors: Takayuki Iida, Kanagawa-ken (JP); Jun Enomoto, Kanagawa-ken (JP); Hiroshi Yamaguchi, Kanagawa-ken (JP); Mamoru Shinohara, Kanagawa-ken (JP); Yoichi Nakamura, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 797 days.

(21) Appl. No.: 10/782,881

(22) Filed: Feb. 23, 2004

(65) Prior Publication Data

US 2004/0165063 A1 Aug. 26, 2004

(30) Foreign Application Priority Data

Feb. 24, 2003 (JP) ............................ 2003-046019

(51) Int. Cl.
*H04N 5/76* (2006.01)
(52) U.S. Cl. ................................ 348/231.5; 348/231.2
(58) Field of Classification Search .............. 348/211.2, 348/211.3, 211.1, 207.1, 211.99, 231.2
See application file for complete search history.

(56) References Cited

U.S. PATENT DOCUMENTS

| | | | | |
|---|---|---|---|---|
| 5,946,444 A | * | 8/1999 | Evans et al. ................... 386/46 |
| 6,023,241 A | * | 2/2000 | Clapper ................. 342/357.13 |
| 6,396,537 B1 | * | 5/2002 | Squilla et al. ................ 348/239 |
| 6,507,371 B1 | * | 1/2003 | Hashimoto et al. .......... 348/552 |
| 6,608,563 B2 | * | 8/2003 | Weston et al. ............ 340/573.1 |
| 6,628,899 B1 | | 9/2003 | Kito |
| 2002/0001468 A1 | * | 1/2002 | Kaku ......................... 396/310 |
| 2002/0049728 A1 | * | 4/2002 | Kaku ............................. 707/1 |
| 2002/0191087 A1 | * | 12/2002 | Hashimoto et al. ....... 348/231.3 |
| 2004/0021780 A1 | * | 2/2004 | Kogan ..................... 348/231.3 |
| 2004/0201702 A1 | * | 10/2004 | White ................... 348/207.99 |
| 2004/0201738 A1 | * | 10/2004 | Moores et al. ........... 348/231.2 |

* cited by examiner

*Primary Examiner*—David Ometz
*Assistant Examiner*—Nicholas G Giles
(74) *Attorney, Agent, or Firm*—Birch, Stewart, Kolasch & Birch, LLP

(57) ABSTRACT

An image management system for managing image data obtained by the visitors to a theme park or similar facilities with their own imaging devices in the same manner as the image data obtained by the cameras installed in the facility. The subject user is photographed by the photographing system installed in the theme park to obtain first image data. At the same time, the user ID is obtained from the wireless tag carried by the subject user, which is related to the first image data and stored in the image storage server with the first image data. A second image data obtained by the subject user with a digital camera are also stored in the image storage server with the user ID being related to the second image data. The first and second image data are sorted and stored by each of the user IDs.

7 Claims, 11 Drawing Sheets

| USER 1 | USER 2 | USER 3 | USER 4 | ... |

| No. | FILE NAME | DATE AND TIME | LOCATION | CAMERA ID |
|---|---|---|---|---|
| 1 | 0024.jpg | 2002.11.06 10:32 | PHOTOGRAPHING AREA 5A | 1A |
| 2 | DSC0001.jpg | 2002.11.06 10:45 | AREA 7A | |
| 3 | 0044.jpg | 2002.11.06 11:15 | PHOTOGRAPHING AREA 5B | 1B |
| ... | | | | |

IMAGE MANAGEMENT SYSTEM MANAGING IMAGE DATA OBTAINED FROM AN IMAGING DEVICE CARRIED BY A VISITOR TO AN AREA IN A SAME MANNER AS IMAGE DATA OBTAINED FROM IMAGINING DEVICES FIXED TO PARTICULAR LOCATIONS IN THE AREA

This Non-provisional application claims priority under 35 U.S.C. § 119(a) on Patent Application No(s). 2003-046019 filed in Japan on Feb. 24, 2003, the entire contents of which are hereby incorporated by reference.

BACKGROUND OF THE INVENTION

1. Field of the Invention

The present invention relates to an image management system for storing and managing image data obtained by the cameras installed at the regular spots of a theme park and other similar facilities.

2. Description of the Related Art

Recently, a printing system has been proposed in which a regular spot camera is installed within an attraction of a theme park and other similar facilities to take photographs of visitors as the subject, and the printout of the image data obtained by photographing is handed over to the visitors. In such a printing system, the printout is handed over to the visitors in each of the attractions, thus they have inconvenience to have to wait until the printout becomes available to them in each of the attractions.

For this reason, photographing systems having a plurality of regular spot cameras have been proposed as described, for example, in U.S. Pat. No. 6,628,899, in which wireless tags similar to. the wireless IC card, having ID information recorded thereon for identifying each of the visitors are handed over to the visitors. In the system, the ID information is transmitted from the wireless tag to a communication device installed with the regular spot camera at the time of photographing, which is related to the image data obtained by photographing and stored in an image server with the image data. Thus, the visitor may refer to all his/her photographs taken at a theme park by accessing the image server and searching the image data based on the ID information at a later date, so that the burden of the visitors to have to wait until the printout becomes available to them in each of the attractions may be reduced. Further, in the system described in U.S. Pat. No. 6,628,899, the visitors may also operate the regular spot camera by operating the wireless tag to take their photographs with the face turning to the camera.

If the visitor to a theme park has a digital camera or cellular phone with a built-in camera, the visitor may obtain the image data obtained by the regular spot camera installed in the theme park (hereinafter referred to as "first image data") and those obtained by his/her digital camera (herein after referred to as "second image data"). When the first and second image data are obtained in this way, the visitor wants to send the second image data to the image server where the first image data are stored to manage the second image data in the same manner as the first image data.

SUMMARY OF THE INVENTION

The present invention has been developed in recognition of the circumstance described above, and it is an object of the present invention to provide an image management system capable of managing the second image data obtained by the visitor to a theme park with his/her own imaging device in the same manner as the first image data obtained by the regular spot cameras in a theme park.

The image management system of the present invention comprises: a plurality of photographing systems, each having a second communication means for receiving identification information for identifying a subject transmitted from a first communication means carried by the subject, a photographing means installed at a regular spot for obtaining a first image data representing the image of the subject by photographing the subject, and a first output means for outputting the identification information received by the second communication means, date and time information of photographing that indicates the date and time of photographing of the first image data, installation site information that indicates the location of the photographing means, and the first image data; at least one camera image obtaining system having a third communication means for receiving the identification information transmitted from the first communication means, an image obtaining means for obtaining a second image data including the date and time information of photographing that indicates the date and time of photographing obtained by an imaging device such as a digital camera or cellular phone with a built-in camera carried by the subject, and a second output means for outputting the identification information received by the third communication means and the second image data; a storage means connected to the plurality of photographing systems and the camera image obtaining system for storing the first image data outputted from each of the plurality of photographing systems with the identification information received by the second communication means, the date and time information of photographing, and the installation site information being related thereto, and the second image data transmitted from the camera image obtaining system with the identification information received by the third communication means related thereto; and a managing means for managing the first and second image data by sorting the image data by each of the identification information.

As for the first communication means, a long-range (around several meters) wireless tag (RFID: Radio Frequency Identification) and its receiving antenna may be used.

In the image management system of the present invention, the managing means may be adapted to manage the first and second image data by sorting the image data in the order of and time of photographing based on the data and time information of photographing related to the sorted first image data and the date and time information of photographing related to the sorted second image data.

The term "in the order of date and time of photographing" may be either of chronological order or reverse chronological order.

Further, in the image management system of the present invention, the managing means may be adapted to obtain deduced location information of photographing of the second image data by deducing the location of photographing of the sorted second image data based on the installation site information related to at least two files of the first image data, one coming in just before and the other just after the sorted second image data in the order of date and time of photographing, and manage the second image data with the deduced location information of photographing of the second image data being related thereto.

According to the present invention, the subject is photographed by the photographing means of the photographing system and the first image data is obtained. At the same time, the identification information transmitted from the first communication means carried by the subject is received by the second communication means. Then, the identification information received by the second communication means, date and time information of photographing that indicates the date and time of photographing of the first image data, installation site information that indicates the location of the photographing means, and the first image data are outputted from the first output means.

In the mean time, the second image data including the date and time information of photographing stored in the imaging device carried by the subject are obtained by the image obtaining means of the camera image obtaining system. At the same time, the identification information transmitted from the first communication means is received by the third communication means. Then, the identification information received by the third communication means and the second image data are outputted from the second output means.

The first and second image data are stored in the storage means connected to the plurality of photographing systems and the camera image obtaining system. At that time, the first image data are stored with the identification information received by the second communication means, date and time information of photographing of the first image data, and installation site information being related thereto; and the second image data are stored with the identification information received by the third communication means being related thereto. Then, the first and second image data are sorted by the managing means by each of the identification information for management.

Consequently, the subject may refer to the first image data obtained by the photographing system and the second image data obtained by the subject simultaneously by accessing and searching the storage means using the identification information as the search key. Thus, the subject may place the order for the printout and creation of the photo album efficiently not only of the first image data obtained by the photographing system but also of the second image data obtained by the subject.

Further, the subject may refer to the first image data obtained by the photographing system and second image data obtained by the subject in the order of data and time of photographing by sorting the first and second image data in the order of date and time of the photographing based on the date and time information of photographing related to the sorted first and second image data, thereby order placement for the printout and creation of the photo album becomes easier.

Further, it is possible to deduce the location of photographing of the second image data from the locations of photographing of at least two files of the first image data, one coming in just before and the other just after the second image data in the order of date and time of photographing by sorting the first and second image data in the order of date and time of photographing. Accordingly, though roughly, the location of photographing of the second image data may be figured out by deducing the location of photographing of the sorted second image data based on the installation site information related to at least two files of the first image data, one coming in just before and the other just after the sorted second image data in the order of date and time of photographing to obtain the deduced location information of photographing, and managing the second image data with the deduced location information of photographing being related thereto. Thus, when creating the photo album, addition of the character string to the second image data to indicate the location of photographing, and sorting of the first and second image data by each of the locations of photographing are readily made.

BRIEF DESCRIPTION OF THE DRAWINGS

FIG. 9 is a drawing illustrating a sample structure of the data base.

DESCRIPTION OF THE PREFERRED EMBODIMENTS

Figure 1:
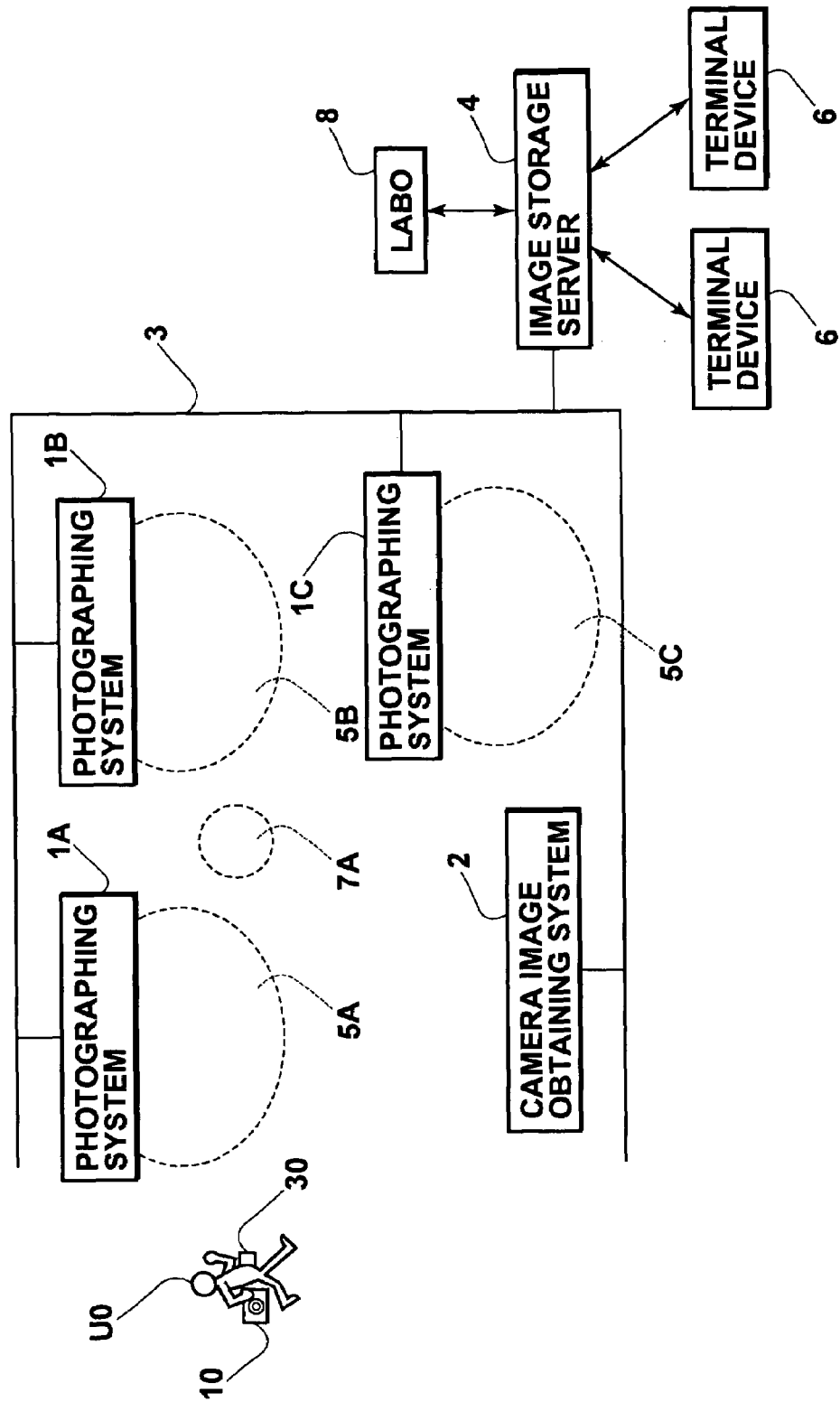
FIG. 1 is a schematic block diagram, illustrating an image management system according to an embodiment of the present invention.

Hereinafter, the preferred embodiment of the present invention will be described with reference to the accompanying drawings. FIG. 1 is a schematic block diagram, illustrating an image management system according to an embodiment of the present invention. As shown in FIG. 1, the image management system according to the embodiment is installed in a theme park, and comprises a plurality (3 in this embodiment) of photographing systems 1A, 1B, and 1C installed in the theme park for photographing individuals visiting the theme park as the subject (hereinafter referred to as "subject user U0") to obtain first image data S1 that represent the image of the subject; a camera image obtaining system 2 for reading out second image data S2 obtained by the subject user U0 by photographing from a digital camera 10 carried by the subject user U0; and an image storage server 4 connected to the photographing systems 1A, 1B, and 1C, and camera image obtaining system 2 through a network 3. The image storage server 4 is connected, through the network 3, to a terminal device 6, such as a personal computer, cellular phone, and PDA owned by the subject user U0, and a lab 8 for printing the image data S1 and S2, creating the photo album, and recording the image data on a CD-R. The image storage server keeps user IDs recorded on wireless tags 30, which will be described later, with the name and address of the user being related to the ID.

While the subject user U0 moves around carrying the digital camera 10 and wireless tag 30, the subject user U0 is photographed by the photographing systems 1A, 1B, and 1C, as well as obtaining the image data S2 by photographing with the digital camera 10.

The wireless tag 30 is handed over to the subject user U0 at the entrance.

Figure 2:
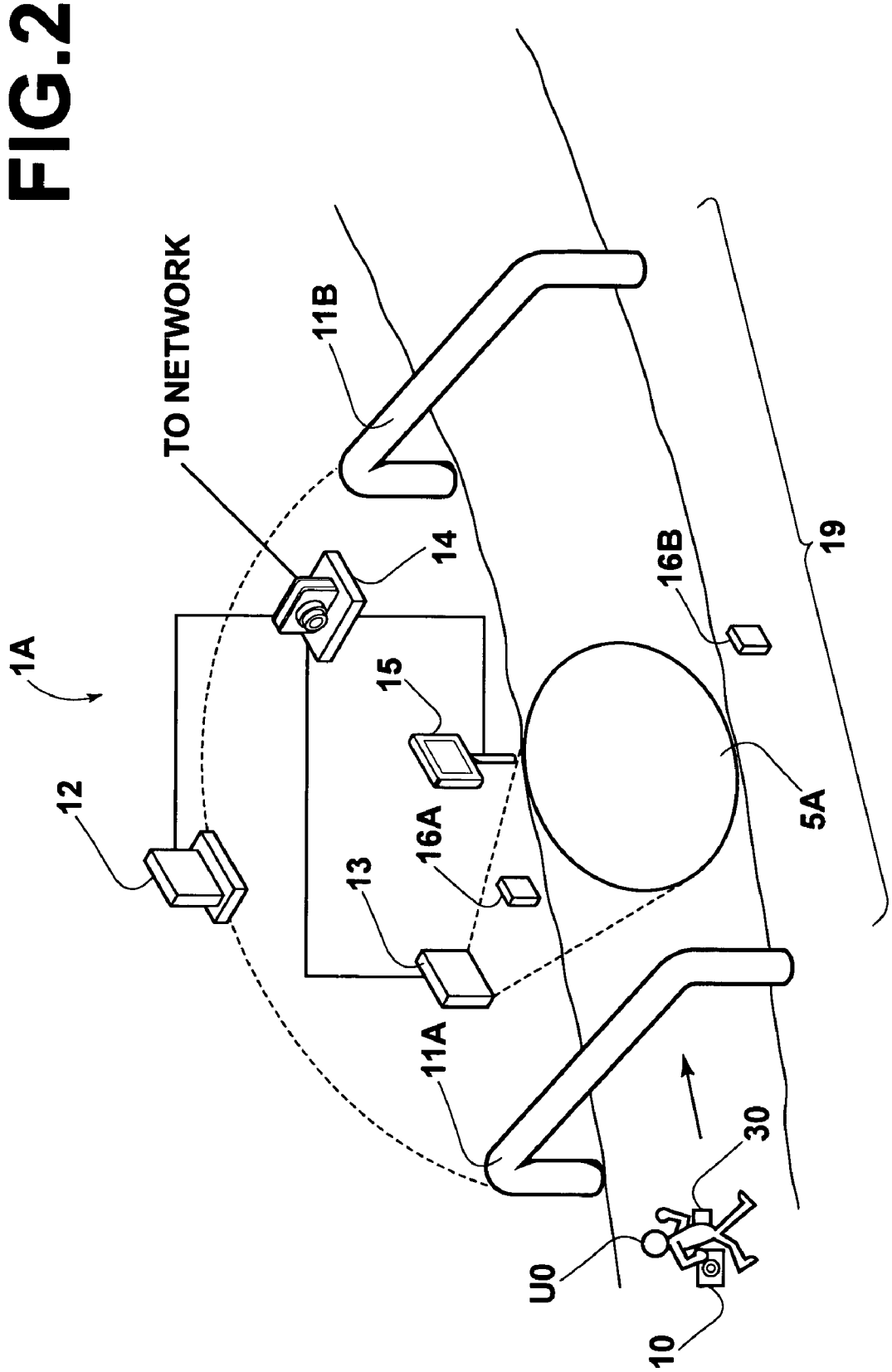
FIG. 2 is a schematic perspective view of the photographing system shown in FIG. 1, illustrating the configuration thereof.

FIG. 2 is a schematic perspective view of the photographing system shown in FIG. 1, illustrating the configuration thereof. Here, only the photographing system 1A will be described, because the configuration of the photographing systems 1A, 1B, and 1C is identical. As shown in FIG. 2, the photographing system 1A is provided for photographing the subject user U0 present in a photographing area 5A in the theme park, and comprises gates 11A and 11B for counting the visitors entered in an area 19; a wide-area sensor for counting the subject users U0 present within the area 19 between the gates 11A and 11B carrying the wireless tag 30; a communication device 13 for communicating with the subject user U0 present in the photographing area 5A carrying the wireless tag 30; a photographing device 14 for photographing the subject user U0; a display 15 for displaying an instruction for photographing to the subject user U0, and the image data S1 obtained by the photographing device 14; and human sensors 16A and 16B, each comprising an infrared or ultrasonic sensor for detecting the subject user U0 present in the photographing area 5A so that the subject user may be captured by the photographing device 14.

The gates 11A and 11B are provided for counting the visitors entered into the area 19 regardless of whether or not the visitor carries the wireless tag 30, and the result is entered, for example, into a system (not shown) of the theme park installed at the same site of the image storage server 4, and used for keeping track of the number of visitors entered into the area 19. The number of visitors counted is also entered into the photographing device 14 and used for controlling the operation of the photographing.

As for the gates 11A and 11B, any gate capable of counting heads may be used, such as that which is designed to count heads with an electronic light bulb, that having a rotatable blocking bar and passing the individuals through the gate by rotating the bar to count heads, and the like.

Figure 3:
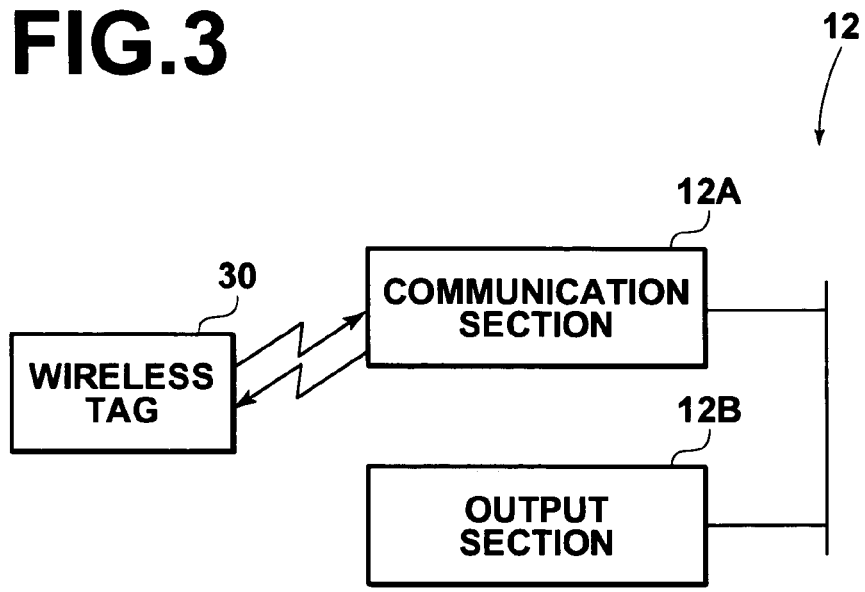
FIG. 3 is a schematic block diagram of the wide-area sensor shown in FIG. 2, illustrating the configuration thereof.

The wide-area sensor 12 detects the subject user U0 present in the area 19 carrying the wireless tag 30. FIG. 3 is a schematic block diagram of the wide-area sensor 12 illustrating the configuration thereof. As shown in FIG. 3, the wide-area sensor 12 comprises: a communication section 12A for transmitting an inquiry signal that carries inquiry information at a predetermined time period and receiving a response signal to the inquiry signal from the wireless tag 30; and an output section 12B for outputting a signal indicating that the response signal has been received and the response information represented by the response signal to the photographing device 14.

Figure 4:
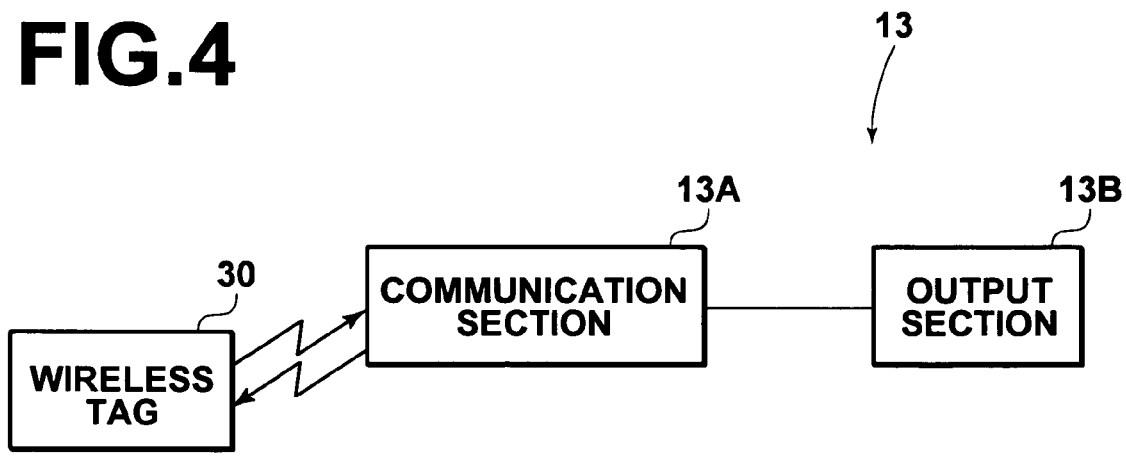
FIG. 4 is a schematic block diagram of the communication device shown in FIG. 2, illustrating the configuration thereof.

The communication device 13 communicates with the subject user U0 present in the photographing area 5A carrying the wireless tag 30. FIG. 4 is a schematic block diagram of the communication device 13 illustrating the configuration thereof. As shown in FIG. 4, the communication device 13 comprises: a communication section 13A for transmitting an inquiry signal that carries inquiry information at a predetermined time period, and receiving a response signal to the inquiry signal from the wireless tag 30 and an instruction signal for photographing transmitted from the wireless tag 30; and an output section 13B for outputting the response signal received by the communication section 13A to the photographing device 14.

The response information represented by the response signal transmitted from the wireless tag 30 includes the user ID for identifying the subject user U0. The user ID is a number or symbol unique to the subject user U0, which may be the number recorded on the wireless tag in advance or the number/symbol to be recorded on the wireless tag 30 at the request of the subject user U0 when the wireless tag 30 is handed over to the subject user U0.

Figure 5:
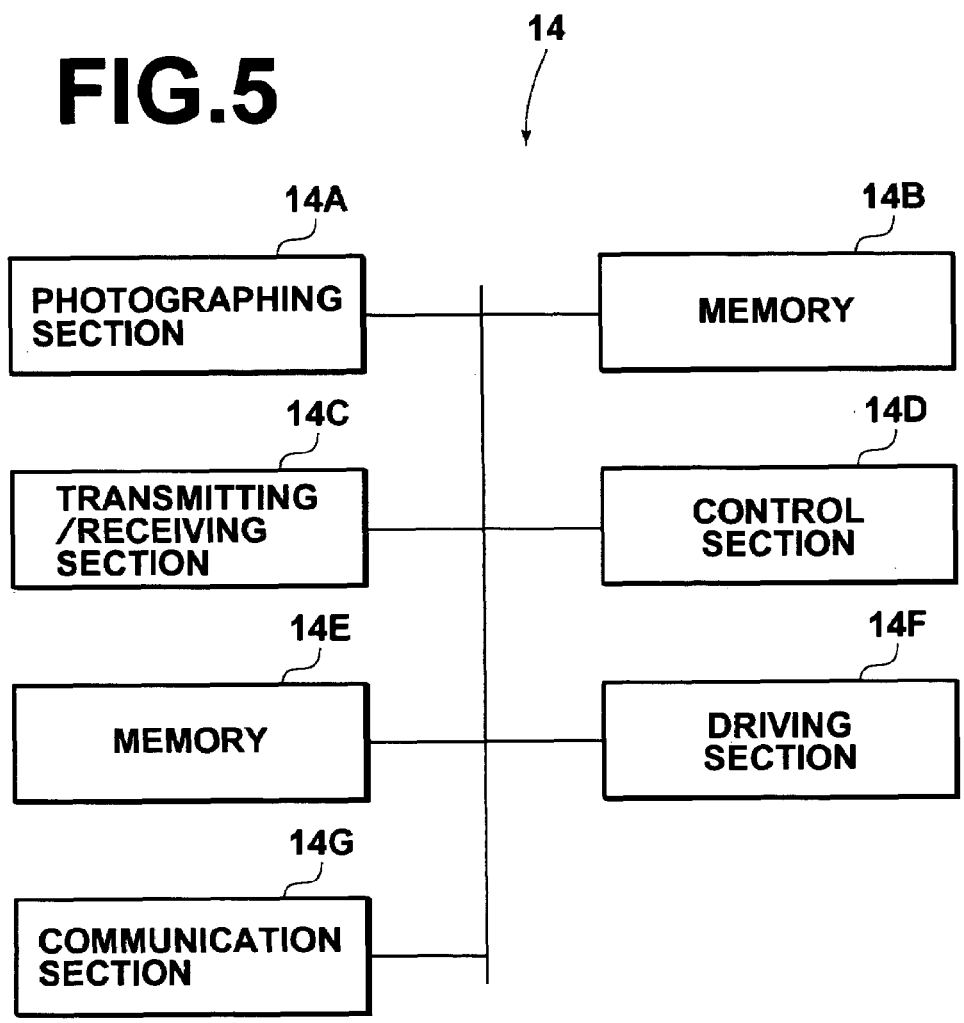
FIG. 5 is a schematic block diagram of the photographing device shown in FIG. 2, illustrating the configuration thereof.

FIG. 5 is a schematic block diagram of the photographing device illustrating the configuration thereof. As shown in FIG. 5, the photographing device 14 comprises: a digital camera having a photographing section 14A for obtaining the first image data S1 by photographing; a first memory 14B for temporarily storing the first image data S1; a transmitting/receiving section 14C for transmitting and receiving signals to/from the gates 11A and 11B, wide-area sensor, communication device 13, display 15, and human sensors 16A and 16B; a control section 14D for controlling the photographing device 14; a second memory 14E for storing control programs and various kinds of information; a driving section 14F for panning and tilting the photographing section 14A; and a communication section 14G connected to the network 3.

In the photographing device 14, the control section 14D puts the photographing section 14A on the hot standby state for photographing based on the signal transmitted from the wide-area sensor 12 to the photographing device 14 indicating that the wide-area sensor 12 has received a response signal.

Further, the photographing device 14 switches the mode of photographing by keeping track of the number of visitors to the area 19 based on the information of the number of visitors to the area 19 obtained by the gates 11A and 11B. More specifically, the control section 14D compares the number of the visitors to the area 19 against a threshold Th1 and switches the mode of photographing to the automatic photographing if the number of the visitors is smaller the threshold Th1, which is suitable for the automatic photographing. When the number of visitors becomes greater or equal to the threshold Th1, in which identification of the individual subject user U0 for photographing is difficult, the control section 14D switches the mode of photographing of the photographing section 14A to put it on standby state.

When the number of the visitors has become greater or equal to the threshold Th1, the mode of photographing may be switched to the manual photographing mode in which the photographing is implemented by the subject user U0 by operating the wireless tag 30, since it is more likely that more than one subject user U0 carrying the wireless tag 30 might be present in the photographing area 5A, and identifying a single subject user U0 is difficult. In such a case, the photographing device 14 transmits an instruction signal to the display 15 for instructing the subject user U0 to implement the photographing at the time of photographing. Further, in such a case, the mode of photographing may be switched to that in which the subject user U0 trying to take a photograph is called out for photographing from the display 15 based on the user ID, or that in which the photographing will take place after making an announcement to the visitors to walk out of the photographing area 5A other than the subject user U0 trying to take a photograph, since the response information represented by the response signal transmitted from the wireless tag 30 includes the user ID. In this preferred embodiment, description will be made on the assumption that the mode of photographing will be switched to the manual mode in such a case. In the manual mode, the photographing device 14 may be adapted to make an announcement to the subject user U0 that the photographing will take place.

Here, in the manual mode and the mode in which an announcement is made to the subject user U0 that the photographing will take place, it is necessary to notify the subject user U0 that the photograph of the subject user U0 will be taken. For this purpose, the control section 14D accesses the image storage server 4 to obtain the user ID included in the response information, refers to a user data base, which will be described later, to obtain information representing the name of the user based on the user ID, and transmits the information representing the user name to the display 15, which in turn calls out the name of the subject user U0 trying to take a photograph.

Further, the photographing device 14 transmits the response information represented by the response signal transmitted from the communication device 13 and the image data S1 obtained by the photographing to the image storage server 4 from the communication section 14G. The first image data S1 obtained by the photographing may be transmitted to the display 15 for display.

Further, the photographing device 14 figures out the position of the subject user U0 in the photographing area 5A based on the signal transmitted from the human sensors 16A and 16B, and implements panning and tilting of the photographing section 14A by driving the driving section 14F such that the subject user U0 comes in the angle of view of the photographing section 14A.

The first image data S1 obtained by the photographing device 14 are transmitted to the image storage server 4 together with the response information represented by the response signal transmitted from the communication device 13, date and time information of photographing that indicates the date and time of photographing, and installation site information that indicates the installation site of the photographing system 1A. The response information, date and time information of photographing, and installation site information may be transmitted to the image storage server 4 as a separate file from that of the first image data S1, or they may be described on the tag of the first image data S1 to be transmitted together to the image storage server 4. In this preferred embodiment, description will be made on the assumption that the response information, date and time information of photographing, and installation site information will be described on the tag of the first image data S1.

Figure 6:
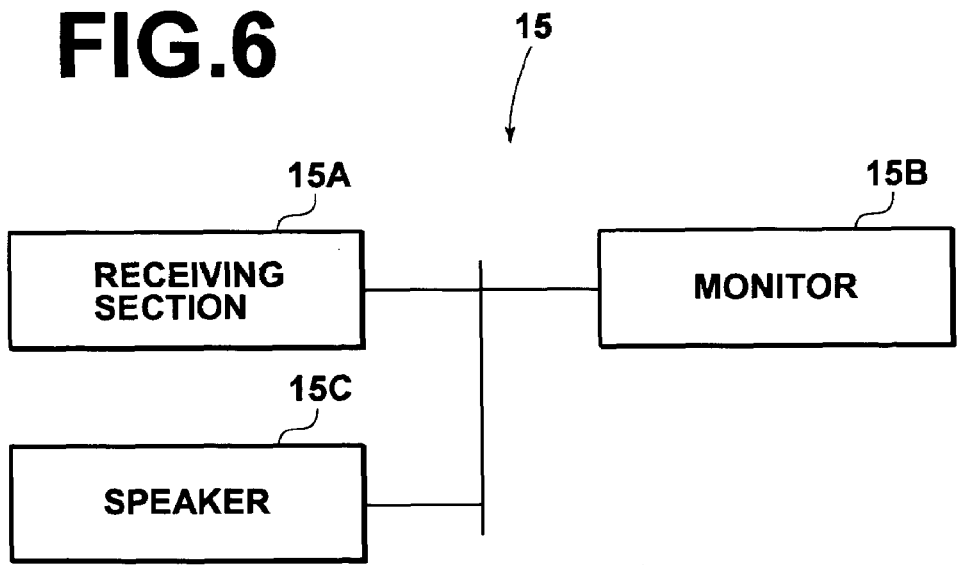
FIG. 6 is a schematic block diagram of the display shown in FIG. 2, illustrating the configuration thereof.

FIG. 6 is a schematic block diagram of the display illustrating the configuration thereof. As shown in FIG. 6, the display 15 comprises a receiving section 15A for receiving instruction signals representing various instructions transmitted from the photographing device 14 and the image data S1; a monitor 15B for displaying the image data S1 and various kinds of information; and a speaker 15C for outputting the speech for instructing the photographing to the subject user U0 and the like based on the instruction signals.

Here, when calling out the subject user U0 as in the case in which the mode of photographing of the photographing device 14 is set in the manual mode or the mode in which an announcement is made to the subject user U0 that the photographing will take place as described above, the instruction is given to the display 15 from the photographing device 14 to call out the name, and the display 15 outputs the speech for identifying the subject user U0 as, for example, "Hi ○○, now its ready to take your picture." or "My dear XX, press the shutter button, will you?"

The human sensors 16A and 16B detect the position of the subject user U0 in the photographing area 5A and transmit the positional signal indicating the position of the subject user U0 to the photographing device 14 for use by the device for panning and tilting. In FIG. 2, two human sensors 16A and 16B are provided, but three or more human sensors may be provided for improving the accuracy in detecting the position of the subject user U0.

Figure 7:
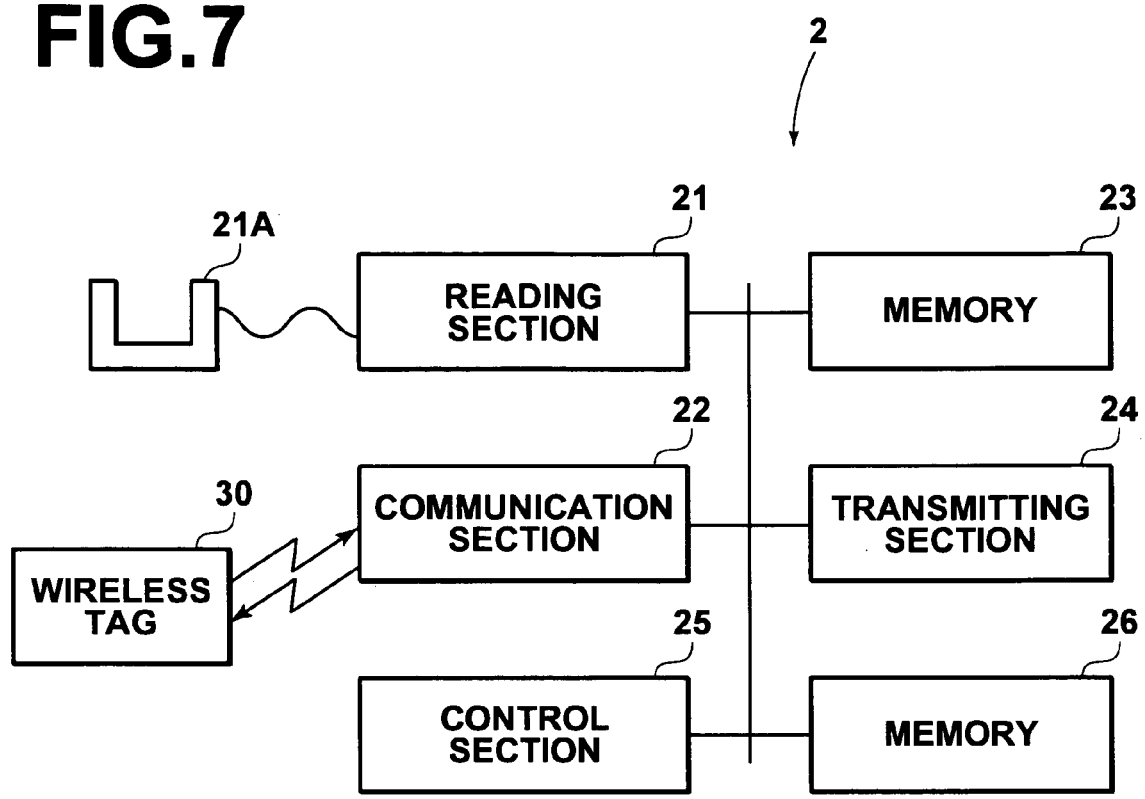
FIG. 7 is a schematic block diagram of the camera image obtaining system shown in FIG. 1, illustrating the configuration thereof.

FIG. 7 is a schematic block diagram of the camera image obtaining system illustrating the configuration thereof. As shown in FIG. 7, the camera image obtaining system 2 comprises: a reading section 21 for reading out the second image data S2 obtained by the subject user U0 by photographing from the digital camera 10 carried by the subject user U0; a communication section 22 for transmitting an inquiry signal representing inquiry information to the wireless tag 30 carried by the subject user U0 and receiving a response signal to the inquiry signal from the wireless tag 30; a first memory for temporarily storing the second image data S2; a transmitting section 24 for transmitting the second image data S2 and the response information represented by the response signal to the image storage server 4; a control section 25 for controlling the operation of the camera image obtaining system 2; and a second memory 26 for storing control programs and various kinds of information.

The reading section 21 is connected to a USB cable for connecting the digital camera 10, a card reader for loading the memory card of the digital camera 10, a cradle for mounting the digital camera 10, and the like, but in this preferred embodiment, description will be made on the assumption that a cradle 21A for mounting the digital camera 10 will be connected to the reading section 21, and the digital camera 10 will be connected to the cradle 21A for reading out the second image data S2 from the digital camera 10.

The camera image obtaining system 2 reads out the second image data S2 obtained by the subject user U0 from the digital camera 10 when the digital camera is mounted on the cradle 21A of the reading section 21 by the subject user U0, then transmits an inquiry signal to the wireless tag 30 carried by the subject user U0 and receives a response signal transmitted by the wireless tag 30, and thereafter transmits the second image data S2 and the response information represented by the response signal to the image storage server 4. The response information may be transmitted to the image storage server 4 as a separate file from that of the second image data S2, or it maybe described on the tag of the second image data S2 to be transmitted together to the image storage server 4. Further, the date and time information of photographing that indicates the date and time of photographing is described on the tag of the second image data S2. In this preferred embodiment, description will be made on the assumption that the response information will be described on the tag of the second image data S2.

Figure 8:
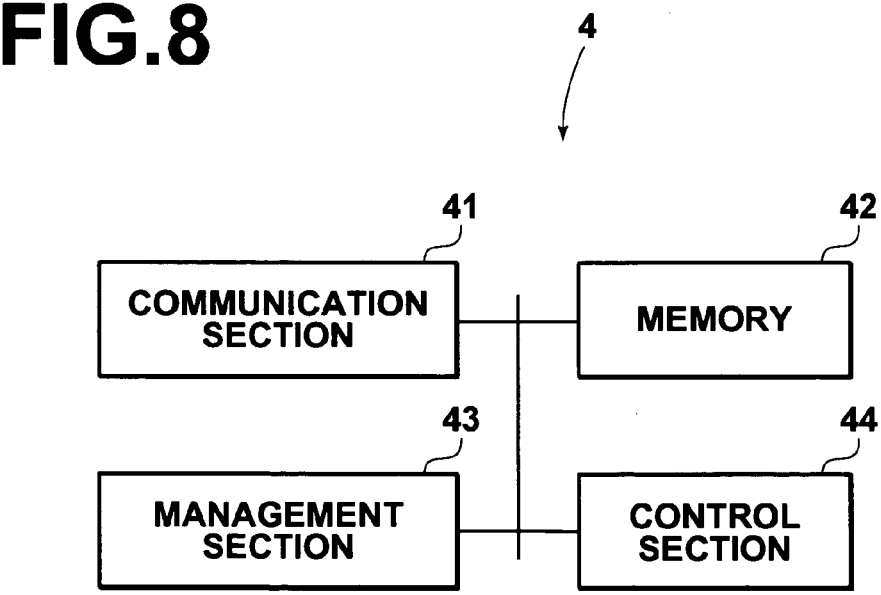
FIG. 8 is a schematic block diagram of the image storage server shown in FIG. 1, illustrating the configuration thereof.

FIG. 8 is a schematic block diagram of the image storage server 4 illustrating the configuration thereof. As shown in FIG. 8, the image storage server 4 comprises: a communication section 41 for communicating with the photographing systems 1A, 1B, and 1C, camera image obtaining system 2, terminal device 6 of the subject user U0, and lab 8 through the network 3; a large memory 42 for storing various kinds of information including the data base DB1 for retrieving the first and second image data S1 and S2, control programs for image storage server 4, user data base DB2 containing user IDs being related to the user information, and the like; a management section 43 for managing the first and second image data S1 and S2 stored in the memory 42 by generating the data base DB1 stored in the memory 42; and a control section 44 for controlling the operation of the image storage server 4.

The management section 43 generates the data base DB1 based on the information described on the tag (tag information) of the first image data S1 transmitted from the photographing systems 1A, 1B, and 1C, and the tag information of the second image data S2 transmitted from the camera image obtaining system 2. The tag information of the first image data S1 includes the file name of the first image data S1, user ID of the subject user U0 represented by the response information, date and time information of photographing, installation site information, camera ID, and camera setting information.

The camera setting information includes the use of strobe light, zoom setting, and amount of panning and tilting at the time of photographing. The tag information of the second image data S2 includes the file name of the second image data S2, user ID of the subject user U0 represented by the response information, date and time information of photographing, and camera setting information.

The management section 43 sorts the first and second image data S1 and S2 by each of the subject users U0 based on the user ID of the subject user U0 included in the tag information of the first and second image data S1 and S2, and further sorts the first and second image data S1 and S2 in chronological order based on the date and time information of photographing described on the tags of the first and second image data S1 and S2 to generate the data base DB1.

FIG. 9 is a drawing illustrating a sample structure of the data base DB1. As shown in FIG. 9, the data base DB1 is sorted by each of the user IDs (indicated as user 1, user 2, and so on in FIG. 9), and the first and second image data S1 and S2 are sorted such that the file names of the first and second image data S1 and S2 are arranged in chronological order by each of the user IDs.

In FIG. 9, the No.1 image data of the user 2 were obtained by the photographing system 1A with the file name, 0024.jpg; date and time of photographing, 10:32 on Nov. 6, 2002; location of photographing, photographing area 5A; and camera ID, 1A.

The No.2 image data of the user 2 were obtained by the digital camera of the subject user U0 with the file name, DSC0001.jpg; and data and time of photographing, 10:45 on Nov. 6, 2002.

The No.3 image data of the user 2 were obtained by the photographing system 1B with the file name, 0044.jpg; date and time of photographing, 11:15 on Nov. 6, 2002; location of photographing, photographing area 5B; and camera ID, 1B.

The management section 43 deduces the location of photographing of the second image data S2 after sorting based on the locations of photographing of at least two files of the first image data S1, one coming in just before and the other just after the second image data S2 in the order of date and time of photographing, and enters the deduced location into the data base DB1 as the location of photographing of the second image data S2. For example, as shown in FIG. 9, the second image data S2 with the file name of DSC0001.jpg may be deduced to have been obtained by the subject user U0 at the area 7A which is located between the photographing areas of 5A and 5B, because the location of photographing of the first image data S1 with the file name of 0024.jpg that comes in before the second image data S2 in the order of date and time of photographing is the photographing area SA, and the location of photographing of the first image data S1 with the file name of 0044.jpg that comes in after the second image data S2 in the order of date and time of photographing is the photographing area 5B. For this reason, management section 43 enters as "area 7A" into the entry of the location of photographing of the second image data S2 with the file name of DSC0001.jpg to generate the data base DB1.

The control section 44 of the image storage server 4 searches the data base DB1 based on the user ID entered into the terminal device 6 by the subject user U0 when accessed by the terminal device 6, and allows the terminal device to view the first and second image data S1 and S2 sorted under that user ID. The subject user U0 directs the order for downloading the first and second image data S1 and S2, creation of the photo album, CD-R recording, and for the printout to the image storage server 4 by operating the terminal device 6.

Figure 10:
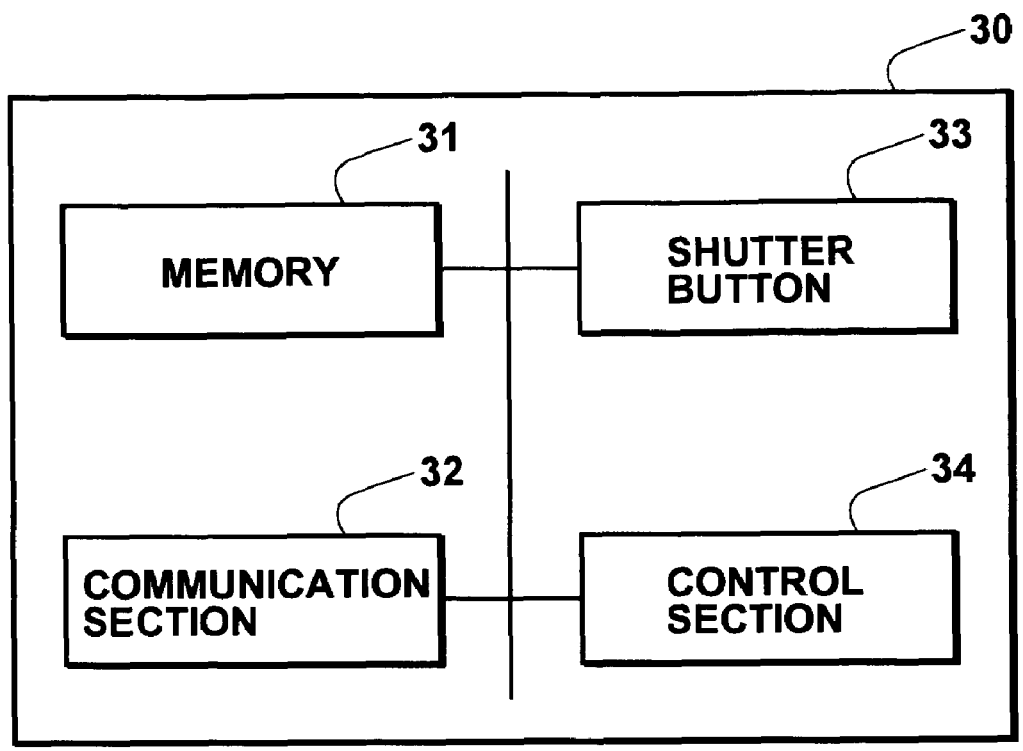
FIG. 10 is a schematic block diagram of the wireless tag shown in FIG. 1, illustrating the configuration thereof.

FIG. 10 is a schematic block diagram of the wireless tag 30 illustrating the configuration thereof. As shown in FIG. 10, the wireless tag 30 comprises: a memory 31 for storing the user ID for identifying the subject user U0 carrying the wireless tag 30; a communication section for receiving an inquiry signal and transmitting a response signal representing response information including the user ID and instruction signal for photographing; a shutter button 33 for giving an instruction to implement photographing at the time of manual photographing; and a control section 34 for controlling the operation of the wireless tag 30, which is shaped like a card to make it easier to be carried by the subject user U0. When the shutter button 33 is depressed, an instruction signal to implement photographing is transmitted to the communication device 13 from the communication section 32.

As for a specific example of the wireless tag 30, a long range RFID having communication range of more than several meters with a built-in battery is appropriate to be cited. The wireless tags 30 are handed over to the subject users U0 who are the visitors to a theme park wishing to be photographed by the photographing systems 1A, 1B, and 1C. At that time, the name, address, telephone number, and the like of the subject user U0 are registered in the user data base DB2 of the image storage server 4, so that it is possible to output the speech identifying the subject user U0 from the display 15 at the time of photographing.

Figure 11:
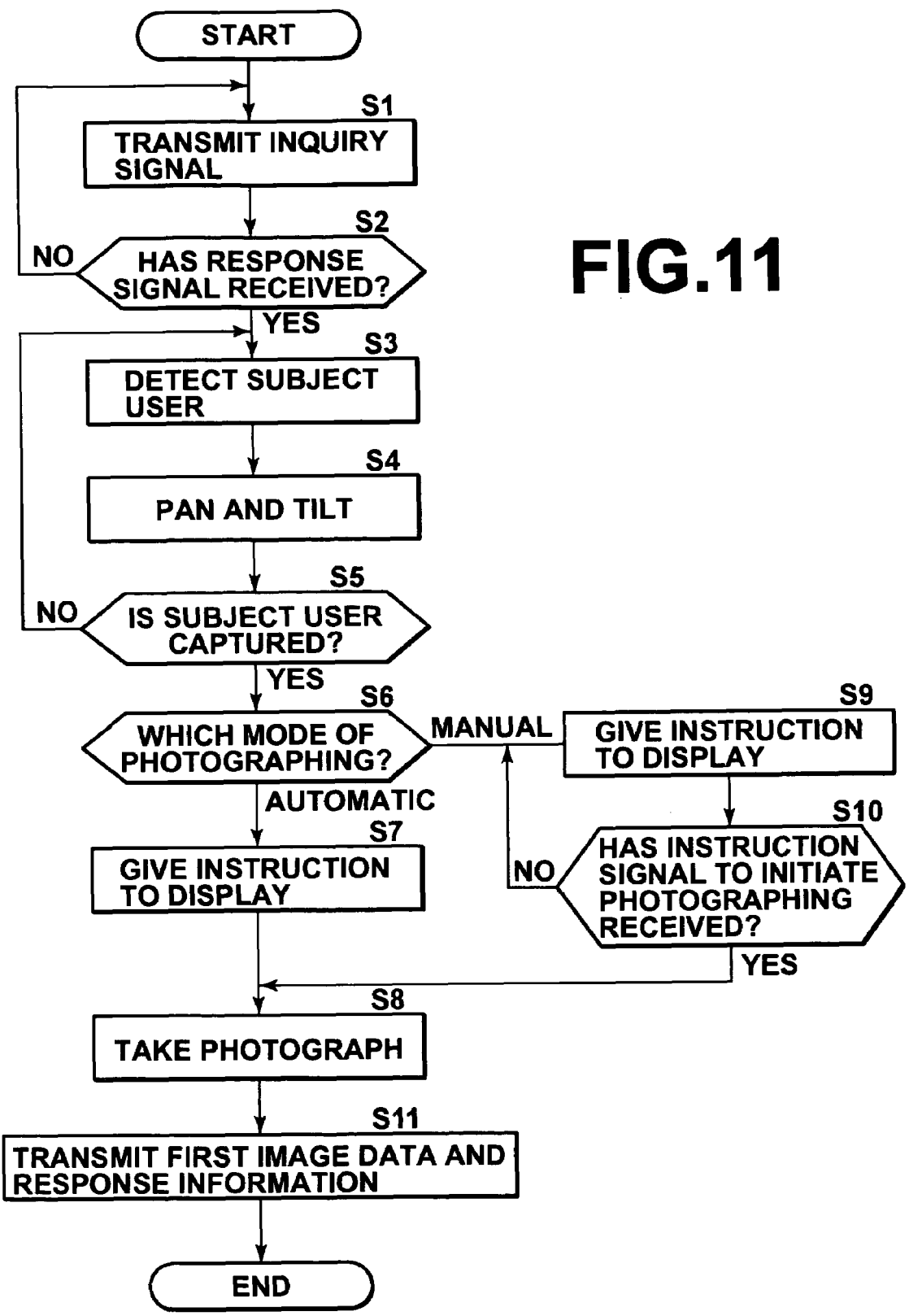
FIG. 11 is a flow chart illustrating the process implemented by the photographing system at the time of photographing.

The process implemented in this preferred embodiment will be described herein below. FIG. 11 is a flow chart illustrating the process implemented by the photographing systems 1A, 1B, and 1C at the time of photographing. Here, the process implemented by the photographing system 1A will be described.

The control section 14D of the photographing device 14 constantly transmits an inquiry signal to the communication device 13 at a predetermined time period (step S1), and monitors if a response signal to the inquiry signal from the wireless tag 30 of the subject user U0 present in the photographing area 5A has been received by the communication device 13 (step S2). If step 2 is positive, the subject user U0 in the photographing area 5A is detected by the human sensors 16A and 16B (step S3), and panning and tilting of the photographing section 14A are implemented such that the subject user U0 is captured by the photographing section 14A (step S4).

The control section 14D determines if the photographing section 14A has captured the subject user U0 (step S5), and returns to step S3 if step S5 is negative. If step S5 is positive, the control section 14D determines if the mode of photographing is the automatic photographing or manual photographing (step S6). The mode of photographing is switched to the manual photographing when the number of the subject users U0 in the area 19 counted by the wide-area sensor 12 is greater than or equal to a predetermined threshold Th1, and to the automatic photographing when the number is smaller the threshold Th1.

When the mode of photographing is in the automatic photographing, the control section 14D issues an instruction to the display 15 that a photograph is to be taken (step S7), and the photographing section 14A implements the photographing to the timing of the speech of instructing the photographing outputted from the display 15 to obtain the first image data S1 (step S8).

When the mode of photographing is in the manual photographing, on the other hand, the control section 14D issues the instruction to the display 15 to have the subject user U0 to depress the shutter button 33 of the wireless tag 30 (step S9).

Then, the control section 14D starts monitoring if the instruction signal to implement the photographing generated by dressing the shutter button 33 by the subject user U0 and transmitted from the wireless tag 30 has been received by the communication device 13 (step S10), and if step S10 is positive, the process moves to step S8 where the photographing section 14A implements the photographing to obtain the first image data S1.

Then, the control section 14D transmits the first image data S1 and the response information represented by the response signal transmitted from the wireless tag 30 to the image storage server 4 through the communication section 14G, and the process is closed.

Figure 12:
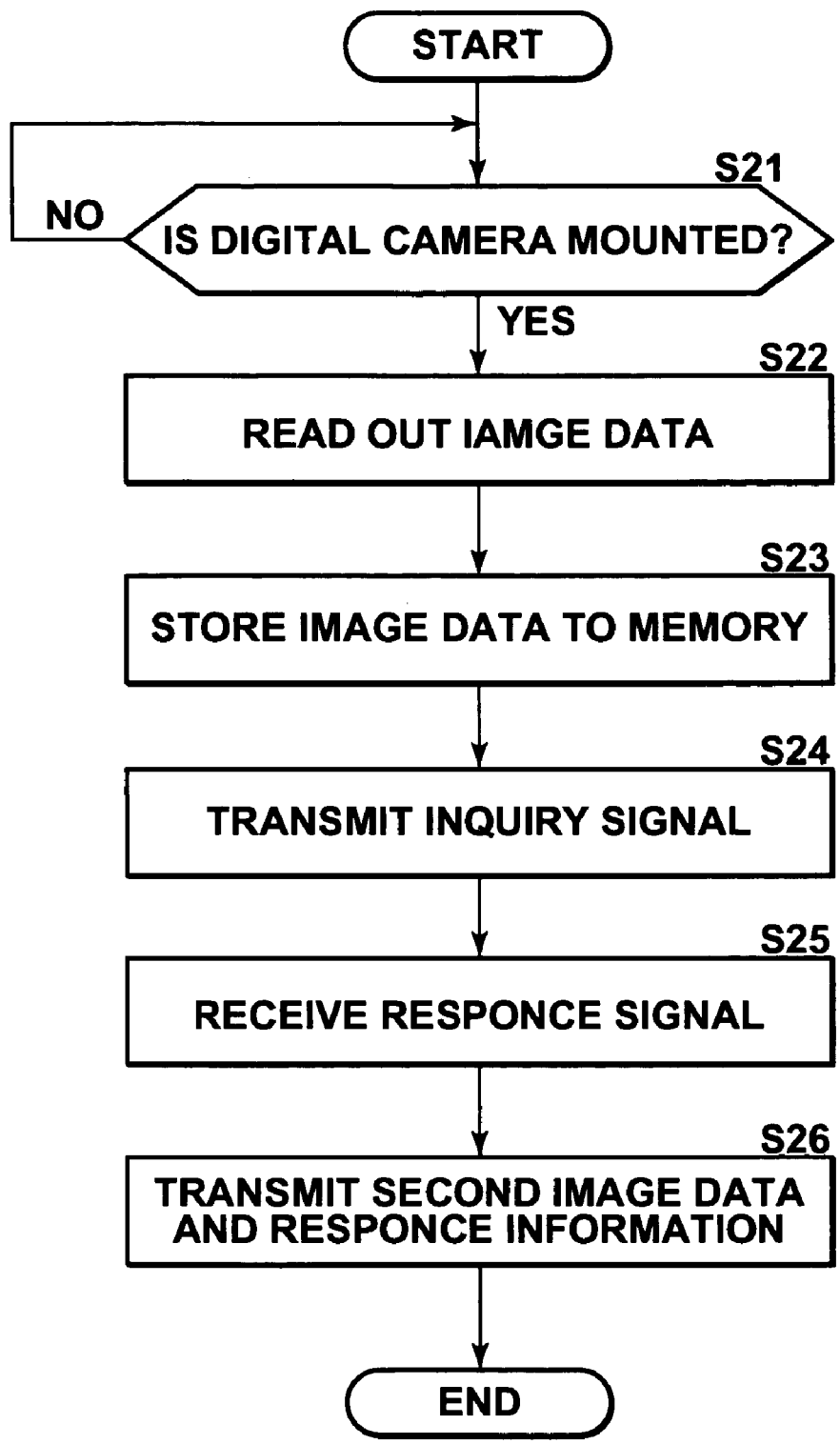
FIG. 12 is a flow chart illustrating the process implemented by the camera image obtaining system.

FIG. 12 is a flow chart illustrating the process implemented by the camera image obtaining system 2. The control section 25 of the camera image obtaining system 2 constantly monitors if the digital camera 10 is mounted on the cradle 21A connected to the reading section 21 (step S21), and if the step S21 is positive, the system 2 reads out the second image data S2 obtained by the subject user U0 by photographing from the digital camera 10 (step S22) and temporarily stores them into the memory 23 (step S23). Then, the system 2 transmits an inquiry signal to the wireless tag 30 carried by the subject user U0 (step S24), and receives a response signal transmitted by the wireless tag 30 (step S25). Thereafter, the system 2 transmits the second image data S2 together with the response information represented by the response signal to the image storage server 4 (step S26), and the process is closed.

In the image storage server 4, the management section 43 generates the data base DB1 based on the tag information of the first image data S1 transmitted from the photographing systems 1A, 1B, and 1C, and the tag information of the second image data S2 transmitted from the camera image obtaining system 2.

Figure 13:
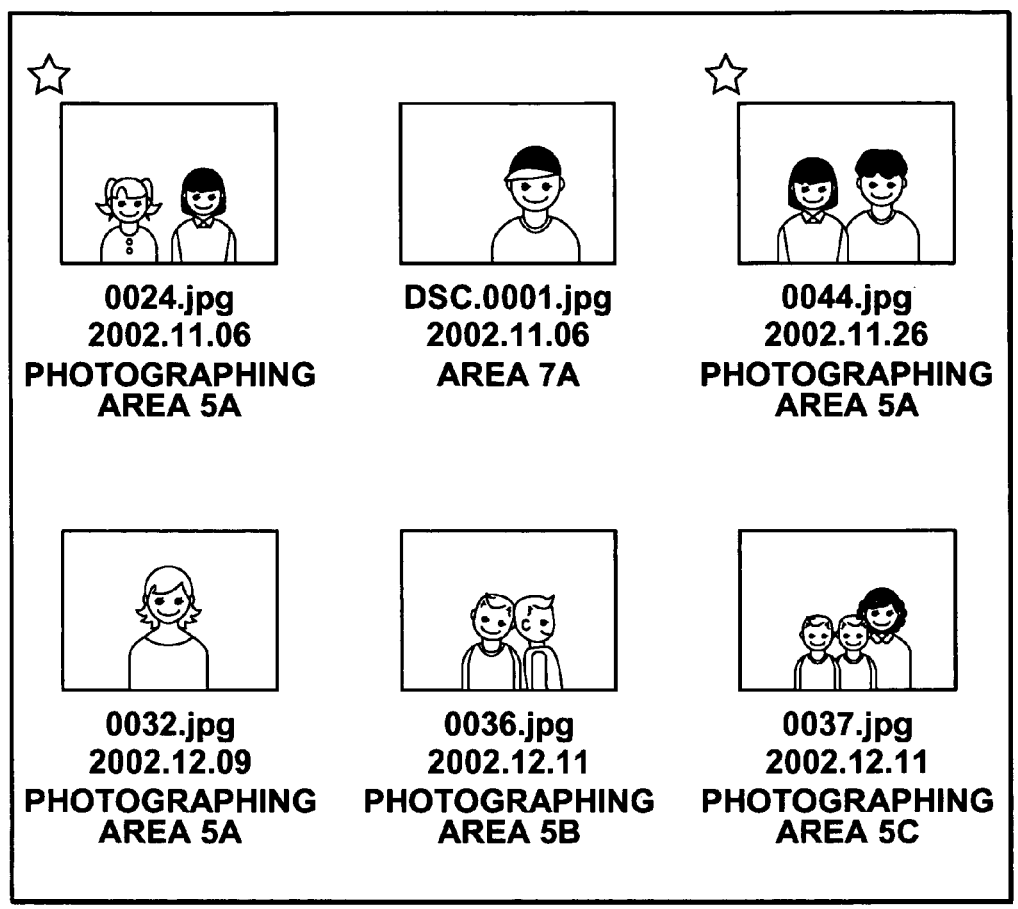
FIG. 13 is a drawing illustrating the view of thumbnail images.

When the image storage server 4 is accessed and the user ID is transmitted by the subject user U0 from the terminal device 6 at a later date, the control section 44 searches the data base DB1 stored in the memory 42 using the user ID as the search key, and displays the first and second image data S1 and S2 sorted under the user ID on the terminal device 6. More specifically, for example, a view of the thumbnails of the image data S1 and S2 sorted in the order of data and time of photographing is displayed on the terminal device 6 as shown in FIG. 13. The view of the thumbnails includes the file name, date and time information of photographing, and deduced place of photographing. Further, the thumbnails of the first image data S1 obtained by the photographing systems 1A, 1B, and 1C are indicated with the mark ☆.

The subject user U0 selects some of the thumbnail images for ordering the printout, CD-R recording, etc. from the view of the thumbnails, and directs the order to the image storage server 4. Further, the subject user U0 may download the desired first and second image data S1 and S2 and create the photo album by himself/herself.

When the order is directed to the image storage server 4, the image storage server 4 transmits the ordered image data S1 and S2 to the lab 8. The lab 8 prints out, or records the first and second image data S1 and S2 in accordance with the order.

As described above, in the preferred embodiment of the present invention, the first image data S1 obtained by the photographing systems 1A, 1B, and 1C, and second image data S2 obtained by the subject user U0 with the digital camera 10 are stored in the image storage server 4 with the image data being sorted by each of the user IDs included in the response information represented by the response signal transmitted from the wireless tag 30, so that the subject user U0 may refer to the first image data S1 obtained by the photographing systems 1A, 1B, and 1C, and the second image data S2 obtained by the subject user U0 simultaneously by accessing and searching the image storage server 4 using the user ID as the search key. Thus, the subject user U0 may place the order for the printout and creation of the photo album efficiently not only of the first image data obtained by the photographing systems 1A, 1B, and 1C, but also of the second image data S2 obtained by the subject user U0.

Further, the first and second image data S1 and S2 are sorted in the order of date and time of photographing based on the date and time information of photographing related to the sorted first image data S1 and the date and time information of photographing related to the sorted second image data S2, so that the subject user U0 may refer to the first image data S1 obtained by the photographing systems 1A, 1B, and 1C, and the second image data S2 obtained by the subject user U0 in the order of the data and time of photographing, thereby order placement for the printout and creation of the photo album becomes easier.

Further, in sorting the first and second image data S1 and S2 in the order of date and time of photographing of these image data, the location of photographing of the second image data S2 is deduced based on the locations of photographing of at least two first image data S1, one comes in just before and the other just after the second image data S2 in the order of date and time of photographing of these image data and the deduced location of photographing is described in the data base DB1, so that, though roughly, the location of photographing of the second image data may be figured out, thereby the location of photographing of the second image data S2 may be given to the second image data S2 with a character string in creating the photo album and it becomes easier to sort the first and second image data S1 and S2 by each of the locations of photographing.

Figure 14:
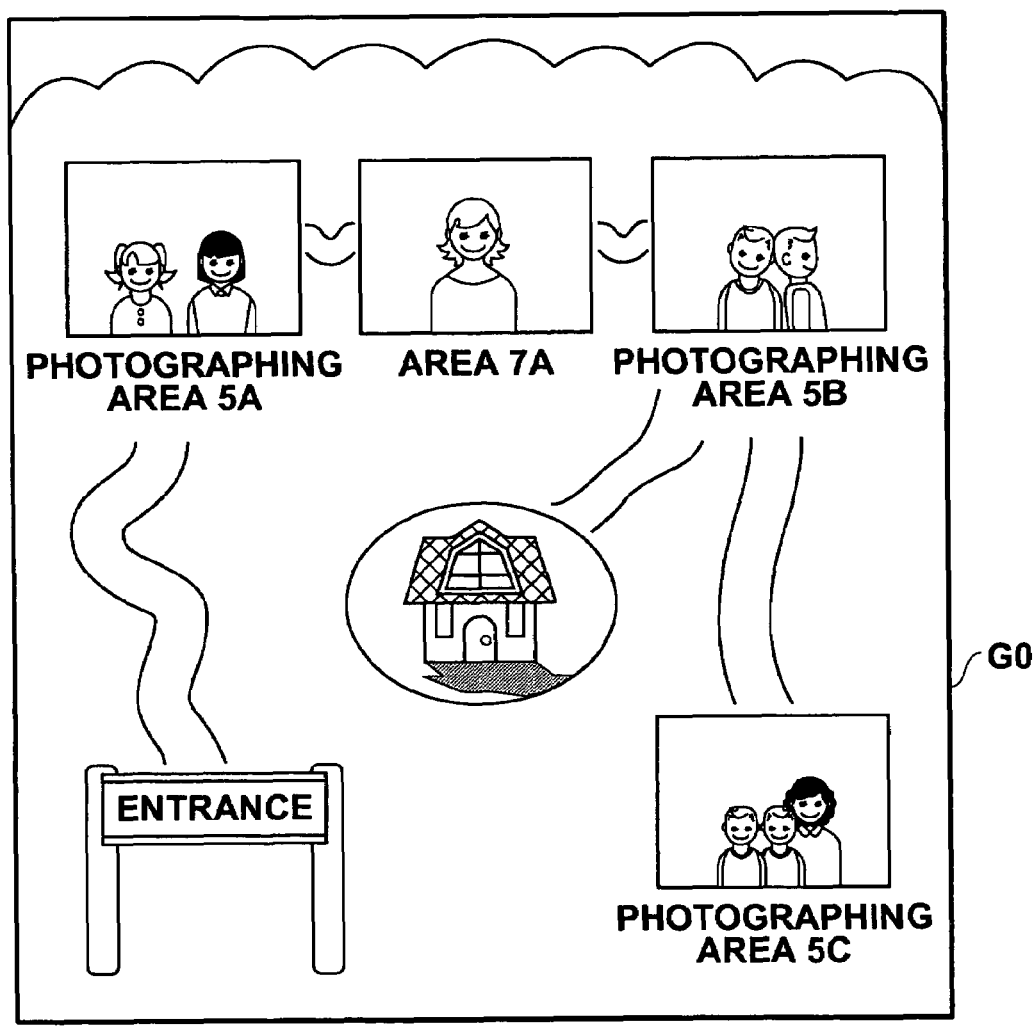
FIG. 14 is a drawing illustrating a sample of composite image.

For example, as shown in FIG. 14, if a template is provided for arranging photographs on the map of a theme park, the second image data S2 obtained by the subject user U0 in the area 7A may also be included in the template, in addition to the first image data S1 obtained by the photographing systems 1A, 1B, and 1C, so that the subject user U0 may obtain a composite image G0 with photographs being inserted in accordance with the places the subject user U0 moved around in the theme park.

Further, in the preferred embodiment described above, three photographing systems 1A, 1B, and 1C are provided, but two photographing systems or more than three photographing systems may be provided.

Still further, in the preferred embodiment described above, the description has been made for the case in which the photographing is implemented by the digital camera 10 carried by the subject user U0, it is obvious that the present invention may also be applied to the case in which the photographing is implemented by a cellular phone with a built-in camera carried by the subject user U0.

What is claimed is:

1. An image management system comprising:
   a plurality of photographing systems;
   at least one camera image obtaining system;
   a storage means; and
   a managing means, wherein
   each of the photographing systems and the at least one camera image obtaining system is connected to the storage means,
   each of said plurality of photographing systems has (i) a second communication means for receiving identification information for identifying a subject transmitted from a first communication means carried by said subject, (ii) a photographing means installed at a particular location for obtaining a first image data representing an image of said subject by photographing said subject, and (iii) a first sending means for sending to the storage means (a) said identification information received by said second communication means, (b) date and time information of photographing that indicates the date and time of photographing of said first image data, (c) installation site information that indicates the particular location of said photographing means, and (d) said first image data, said at least one camera image obtaining system has (i) a third communication means for receiving said identification information transmitted from said first communication means, (ii) an image obtaining means for obtaining a second image data which is transmitted from an imaging device carried by said subject and that is different from said photographing means in said photographing systems, the second image data including the date and time information of photographing that indicates the date and time of photographing of said second image data, and (iii) a second sending means for sending to the storage means said identification information received by said third communication means and said second image data, said storage means stores said first image data outputted from each of said plurality of photographing systems with said identification information received by said second communication means, said date and time information of photographing, and said installation site information that is related thereto, and stores said second image data transmitted from said at least one camera image obtaining system with said identification information received by said third communication means that is related thereto, said managing means manages said first and second image data by sorting said first and second image data by each of said identification information, said managing means manages said first and second image data by sorting said first and second image data in the order of date and time of photographing based on said date and time information of photographing related to said sorted first image data, and said date and time information of photographing related to said sorted second image data, and said managing means obtains deduced location information of photographing of said sorted second image data by deducing the location of photographing of said sorted second image data based on said installation site information related to at least two files of said first image data, one coming in just before and the other just after said sorted second image data in the order of date and time of photographing, and manages said second image data with said deduced location information of photographing that is related hereto.

2. The image management system according to claim 1, wherein said first communication means is a long-range wireless tag.

3. The image management system according to claim 1, wherein said system is installed in a theme park.

4. The image management system according to claim 1, wherein said photographing means implements said photographing of said subject by operating said first communication means.

5. The image management system according to claim 1, wherein said photographing means automatically implements photographing of said subject identified by said identification information.

6. The image management system according to claim 5, wherein said photographing means locks on to said subject identified by said identification information to automatically implement photographing of said subject.

7. The image management system according to claim 1, wherein said storage means stores said first image data with said identification information, date and time information of photographing, and installation site information that is related thereto by describing said identification information, date and time information of photographing, and installation site information on a tag of said image data.

* * * * *